United States Patent
Foster et al.

(10) Patent No.: US 12,492,720 B2
(45) Date of Patent: Dec. 9, 2025

(54) EXTENDING POLE CLAMPING DEVICE

(71) Applicant: WOODLAND TOOLS, INC., Madison, WI (US)

(72) Inventors: Charlton G. A. Foster, Middleton, WI (US); James W. Meiller, Fitchburg, WI (US)

(73) Assignee: Woodland Tools, Inc., Madison, WI (US)

( * ) Notice: Subject to any disclaimer, the term of this patent is extended or adjusted under 35 U.S.C. 154(b) by 382 days.

(21) Appl. No.: 18/172,814

(22) Filed: Feb. 22, 2023

(65) Prior Publication Data

US 2024/0052866 A1  Feb. 15, 2024

Related U.S. Application Data

(60) Provisional application No. 63/398,151, filed on Aug. 15, 2022.

(51) Int. Cl.
*F16B 7/10* (2006.01)

(52) U.S. Cl.
CPC ....... *F16B 7/105* (2013.01); *Y10T 403/32483* (2015.01); *Y10T 403/32508* (2015.01); *Y10T 403/7079* (2015.01)

(58) Field of Classification Search
CPC ........ F16B 7/0406; F16B 7/0426; F16B 7/10; F16B 7/405; F16B 7/14; F16B 7/1454; F16B 7/105; B25G 1/04; Y10T 403/32467; Y10T 403/32475; Y10T 403/32483; Y10T 403/32508; Y10T 403/32516; Y10T 403/32524; Y10T 403/32532;

(Continued)

(56) References Cited

U.S. PATENT DOCUMENTS 4,029,279 A * 6/1977 Nakatani ............... F16B 7/1454
                                                    403/109.5
4,362,415 A * 12/1982 Metz ........................ F16B 7/10
                                                    403/328

(Continued)

FOREIGN PATENT DOCUMENTS

DE          10211251 A1 * 10/2003  ............. F16B 7/105
KR       20100045888 A  *  5/2010  ............. A01G 3/025
WO    WO-2020035840 A1 *  2/2020  ............. B62K 15/00

*Primary Examiner* — Amber R Anderson
*Assistant Examiner* — Kevin J Baynes
(74) *Attorney, Agent, or Firm* — Charles S. Sara; Yanjun Ma; DeWitt LLP

(57) ABSTRACT

An extending pole clamping device comprises a main body mounted on one end of an outer pole that receives insertion of an inner pole, a second body surrounding the inner pole and connected to the main body at the back portion, and a clamping lever rotatably connected at a base thereof to dual ramps at a front side of the second body. The extending pole clamping device further comprises a push button at a front side of the main body, wherein the push button is linked to an engagement pin that penetrates the outer pole and inserts into an engagement hole on the inner pole. The extending pole clamping device is unlocked by firstly opening the clamping lever and secondly depressing the push button to allow adjustment of the length of the inner pole, and locked by firstly releasing the push button and secondly closing the clamping lever.

11 Claims, 10 Drawing Sheets

(58) Field of Classification Search
CPC ........... Y10T 403/595; Y10T 403/7077; Y10T 403/7079; Y10T 403/7081
See application file for complete search history.

(56) References Cited

U.S. PATENT DOCUMENTS

| | | | | |
|---|---|---|---|---|
| 4,761,092 A * | 8/1988 | Nakatani | ............ | F16M 11/2021 403/109.5 |
| 5,154,449 A * | 10/1992 | Suei-Long | ............ | F16B 7/1454 285/298 |
| 5,983,455 A * | 11/1999 | Polzin | ................ | B05C 17/0205 15/144.4 |
| 6,247,882 B1 * | 6/2001 | Huang | .................... | B60P 7/15 410/151 |
| 6,474,900 B2 * | 11/2002 | Feng | ...................... | A63B 25/08 403/376 |
| 6,536,723 B1 * | 3/2003 | Nakatani | ............... | F16M 11/36 248/163.1 |
| 6,832,784 B1 * | 12/2004 | Chen | ....................... | A47L 9/244 285/320 |
| 6,837,642 B1 * | 1/2005 | Lin | .......................... | F16B 7/105 74/109 |
| 7,097,380 B2 * | 8/2006 | Lee | .......................... | F16B 7/105 15/80 |
| 7,293,934 B1 * | 11/2007 | Huang | ................... | F16B 7/105 403/379.5 |
| 7,581,288 B2 * | 9/2009 | Zhang | .................... | A47L 9/244 403/109.2 |
| 7,774,901 B1 * | 8/2010 | Huang | ................. | A01G 3/0251 16/113.1 |
| 8,388,254 B2 * | 3/2013 | Huang | ................... | F16B 7/105 403/109.1 |
| 8,806,720 B2 * | 8/2014 | Wang | ....................... | B25G 1/04 30/341 |
| 9,248,072 B2 * | 2/2016 | Wu | ............................ | F16B 7/14 |
| 9,403,267 B2 * | 8/2016 | Ho | ............................ | F16B 7/105 |
| 9,651,073 B2 * | 5/2017 | Bukovitz | .............. | F16B 7/1454 |
| 9,752,364 B2 * | 9/2017 | James | ................. | E05D 11/1014 |
| 10,939,751 B1 * | 3/2021 | Chen | ..................... | A47C 19/024 |
| 11,185,972 B2 * | 11/2021 | He | ............................. | B25G 1/04 |
| 11,255,363 B2 * | 2/2022 | Tsai | ........................ | F16B 7/105 |
| 11,441,589 B1 * | 9/2022 | Ravnaas | ............... | F16B 7/1454 |
| 11,478,085 B2 * | 10/2022 | Sollie | ..................... | A47C 7/541 |
| 12,005,562 B2 * | 6/2024 | Lin | ......................... | F16B 7/105 |
| 12,140,177 B2 * | 11/2024 | Huang | .................. | F16M 11/42 |
| 2002/0073557 A1 * | 6/2002 | Huang | ..................... | A01G 3/0475 30/341 |
| 2011/0163216 A1 * | 7/2011 | Huang | ...................... | B66F 1/06 248/354.7 |
| 2012/0034023 A1 * | 2/2012 | Wang | ....................... | B60P 7/15 403/109.3 |
| 2014/0030012 A1 * | 1/2014 | Lee | ......................... | F16B 7/105 403/326 |
| 2016/0288310 A1 * | 10/2016 | Larouche | ................ | F16B 7/105 |
| 2017/0058930 A1 * | 3/2017 | Liu | ........................ | F16B 7/105 |
| 2018/0036868 A1 * | 2/2018 | Maki | ........................ | B25G 1/04 |
| 2022/0170287 A1 * | 6/2022 | Alma | ...................... | E04H 15/46 |
| 2022/0234673 A1 * | 7/2022 | Wang | ................... | B62K 15/006 |

* cited by examiner

EXTENDING POLE CLAMPING DEVICE

CROSS-REFERENCE TO RELATED APPLICATION

The application claims priority to U.S. provisional application Ser. No. 63/398,151, filed Aug. 15, 2022, which is incorporated herein by reference in its entirety.

FIELD OF THE INVENTION

The present disclosure is directed to an extending pole clamping device having two complementary locking mechanisms.

BACKGROUND

Current clamps for securing extending poles are difficult or confusing to operate. Twist style clamps can be difficult to clamp effectively or impossible to unlock after tightening. Other cam/lever style clamps may only have one method of locking. Clamps with both cam/lever style locking mechanism and secondary button lock are confusing for users to solve how to operate. Thus, there is an unmet need in the art for an easy to use extending pole clamping device with increased locking reliability.

SUMMARY OF THE INVENTION

Disclosed herein is an extending pole clamping device having two complementary locking mechanisms. The extending pole clamping device 300 is configured to connect an outer pole 100 and an inner pole 200. The extending pole clamping device 300 comprises:

a main body 310 mounted on one end of the outer pole 100 that receives insertion of the inner pole 200;

a second body 320 surrounding the inner pole 200, wherein a back portion of the second body 320 is connected to a back portion of the main body 310, and the second body 320 comprises dual ramps 321 and 322 at a front side thereof; and a clamping lever 330 rotatably connected at a base 331 thereof to the dual ramps 321 and 322 of the second body 320 to allow the clamping lever 330 rotating in a longitudinal direction of the outer pole 100 and the inner pole 200.

When the clamping lever 330 is closed, the base 331 of the clamping lever 330 engages with the dual ramps 321 and 322 of the second body 320 to exert clamping force on the inner pole 200. When the clamping lever 330 is open, the base 331 of the clamping lever 330 disengages with the dual ramps 321 and 322 of the second body 320, and the clamping force on the inner pole 200 is released.

The extending pole clamping device 300 further comprises a push button 312 at a front side of the main body 310, wherein the push button 312 is linked to an engagement pin 314 that penetrates the outer pole 100 and inserts into an engagement hole 201 on the inner pole 200. In some embodiments, the inner pole 200 comprises two or more engagement holes. In preferred embodiments, the push button 312 is linked to the engagement pin 314 by a rod 313, wherein the rod 313 is pivotally connected to the front side of the main body 310.

When the clamping lever 330 is closed, the push button 312 is covered by the clamping lever 330 and cannot be actuated. When the clamping lever 330 is open, the push button 312 is exposed to allow actuation.

When the push button 312 is depressed, the engagement pin 314 is released from the engagement hole 201 on the inner pole 200, allowing longitudinal movement of the inner pole 200.

To unlock the extending pole clamping device 300 and adjust a length of the inner pole 200 inserted into the outer pole 100, a user firstly opens the clamping lever 330, secondly depresses the push button 312 to release the engagement pin 314 from the engagement hole 201 on the inner pole 200, and thirdly moves the inner pole 200 longitudinally to a position where a second engagement hole 202 on the inner pole 200 aligns with the engagement pin 314.

To lock the extending pole clamping device 300 after adjusting the length of the inner pole 200 inserted into the outer pole 100, a user firstly releases the push button 312 such that the engagement pin 314 inserts into the second engagement hole 202 on the inner pole 200, and secondly closes the clamping lever 330.

The clamping lever 330 can be closed only when the engagement pin 314 inserts into an engagement hole on the inner pole 200 and the push button 312 is released.

The extending pole clamping device 300 may further comprise a bar 332 on the inner surface of the clamping lever 330, and when the clamping lever 330 is closed, the bar 332 touches a portion of the main body 310 that is away from the push button 312 to prohibit actuation of the push button 312.

The objects and advantages of the disclosure will appear more fully from the following detailed description of the preferred embodiment of the disclosure made in conjunction with the accompanying drawings.

DETAILED DESCRIPTION OF THE INVENTION

Figure 1:
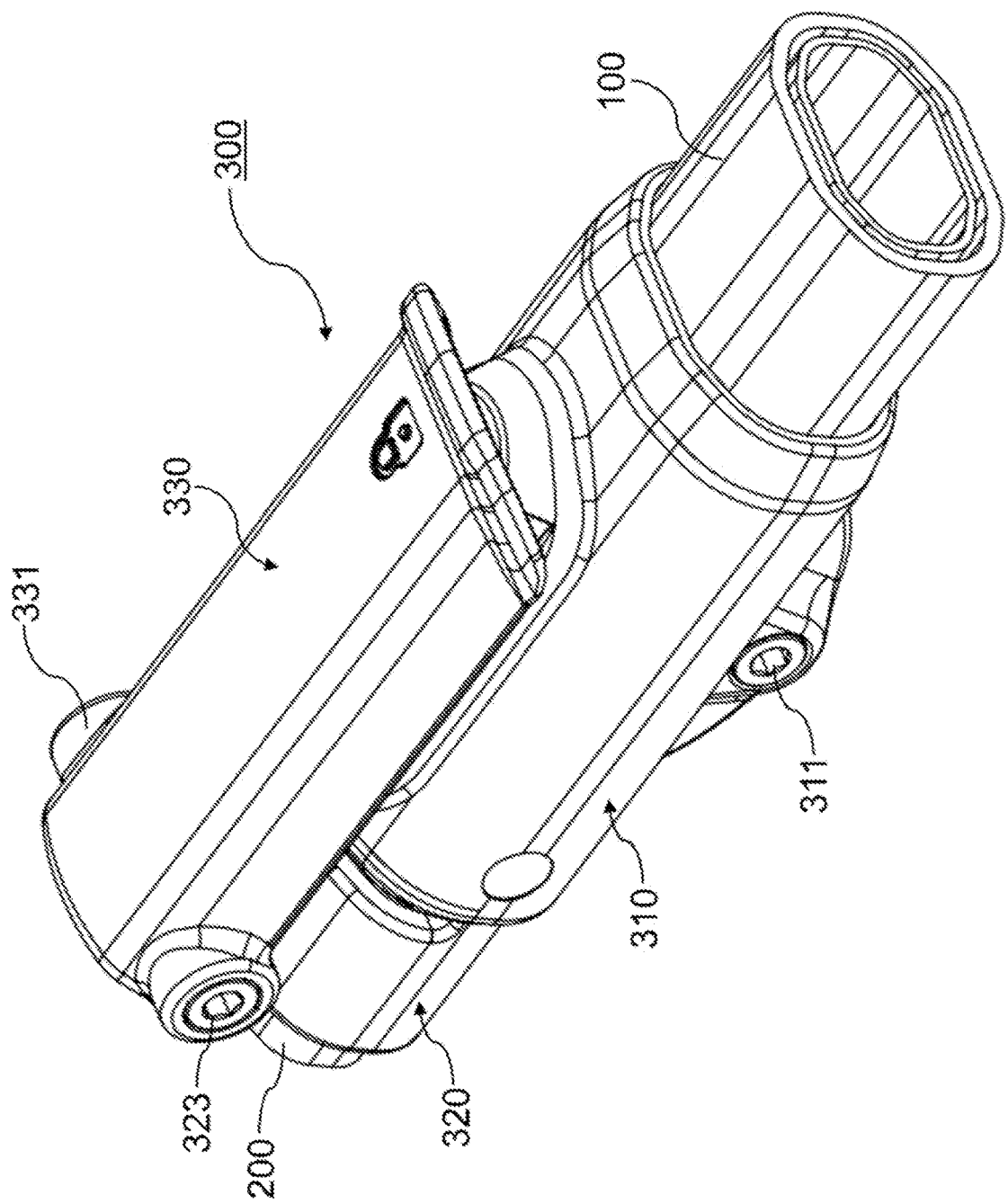
FIG. 1 is a perspective view of an extending pole clamping device when the clamping lever is closed, according to a preferred embodiment of the present disclosure.

Referring to FIGS. 1-10, a preferred embodiment of the present disclosure includes an extending pole clamping device 300 that connects an outer pole 100 and an inner pole 200, wherein one end of the out pole 100 receives insertion of the inner pole 200.

As shown in FIGS. 1-5, the extending pole clamping device 300 comprises a main body 310, a second body 320, and a clamping lever 330.

The main body 310 is mounted on one end of the outer pole 100 that receives the inserted inner pole 200. The main body 310 can be mounted on the end of the outer pole 100 permanently or removably. Any mounting methods known in the art are contemplated to be useful herein. For example, the main body 310 can be glued, riveted, or molded onto the end of the outer pole 100. In the exemplary embodiment shown herein, the main body 310 is mounted on the end of the outer pole 100 by a screw 311 fastening a pair of mounting tabs at the back side of the main body 310.

The second body 320 surrounds the inner pole 200, wherein a back portion of the second body 320 is connected to a back portion of the main body 310.

The second body 320 comprises dual ramps 321 and 322 at a front side thereof. The clamping lever 330 is rotatably connected at a base 331 thereof to the dual ramps 321 and 322 by a screw 323 through pivot holes on the dual ramps 321 and 322 and the base 331, which allows the clamping lever 330 to rotate in a longitudinal direction of the extending poles and cover a front portion of the main body 310 when the clamping lever 330 is closed.

Figure 6:
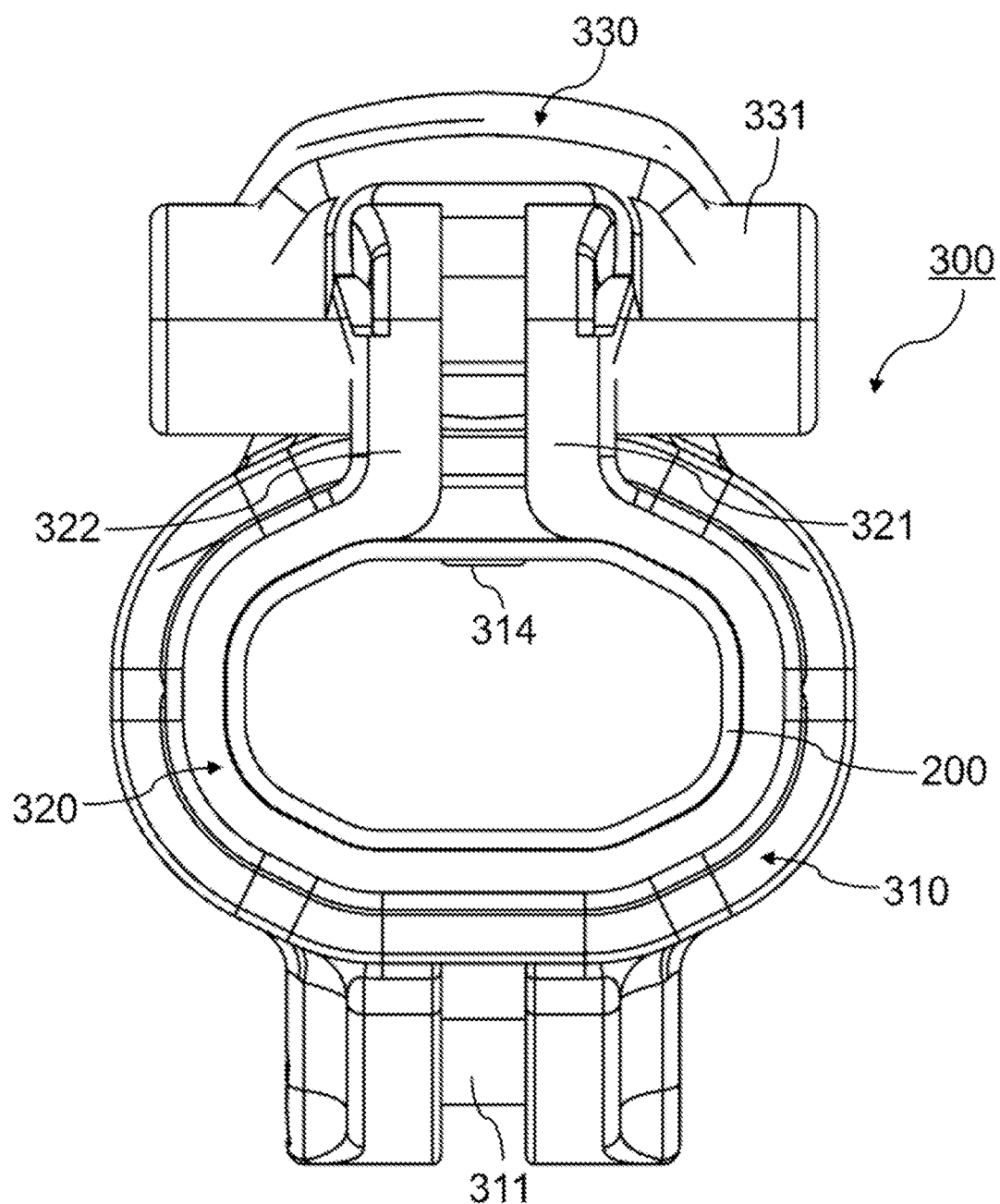
FIG. 6 is a left-side view of the extending pole clamping device when the clamping lever is closed, according to the preferred embodiment of the present disclosure.

As shown in FIG. 6, when the clamping lever 330 is closed, the base 331 of the clamping lever 330 engages the dual ramps 321 and 322 to squeeze the inner pole 200 and exert clamping force on the inner pole 200, such that the inner pole 200 is secured by the dual ramps 321 and 322 of the second body 320. When the clamping lever 330 is open, the base 331 of the clamping lever 330 disengages the dual ramps 321 and 322 and the clamping force on the inner pole 200 is released. The configuration of the dual ramps 321 and 322 gives equal clamping force on the inner pole 200 and hides any of the pinch points that could injure a user.

Figure 2:
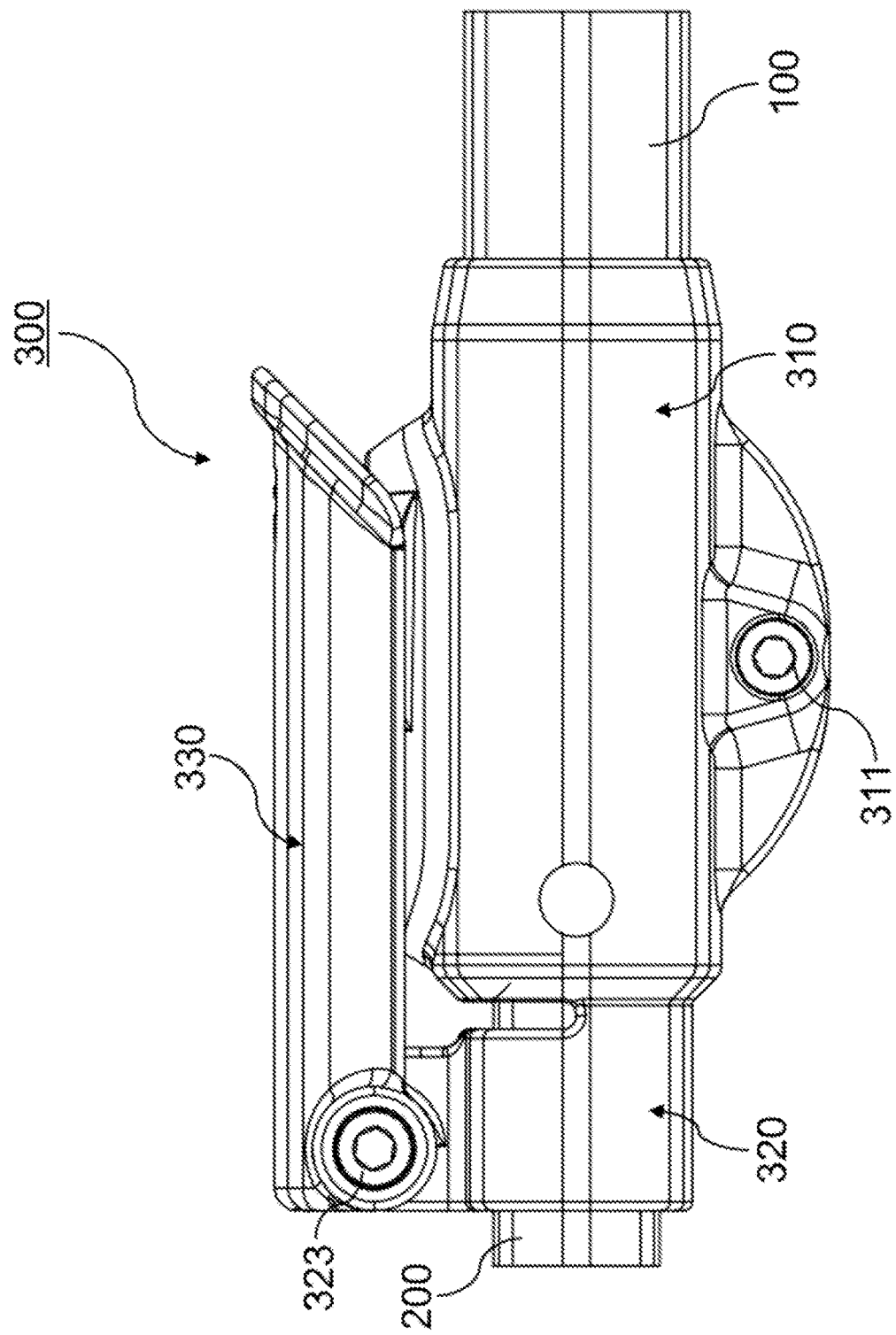
FIG. 2 is a front-side view of the extending pole clamping device when the clamping lever is closed, according to the preferred embodiment of the present disclosure.
Figure 3:
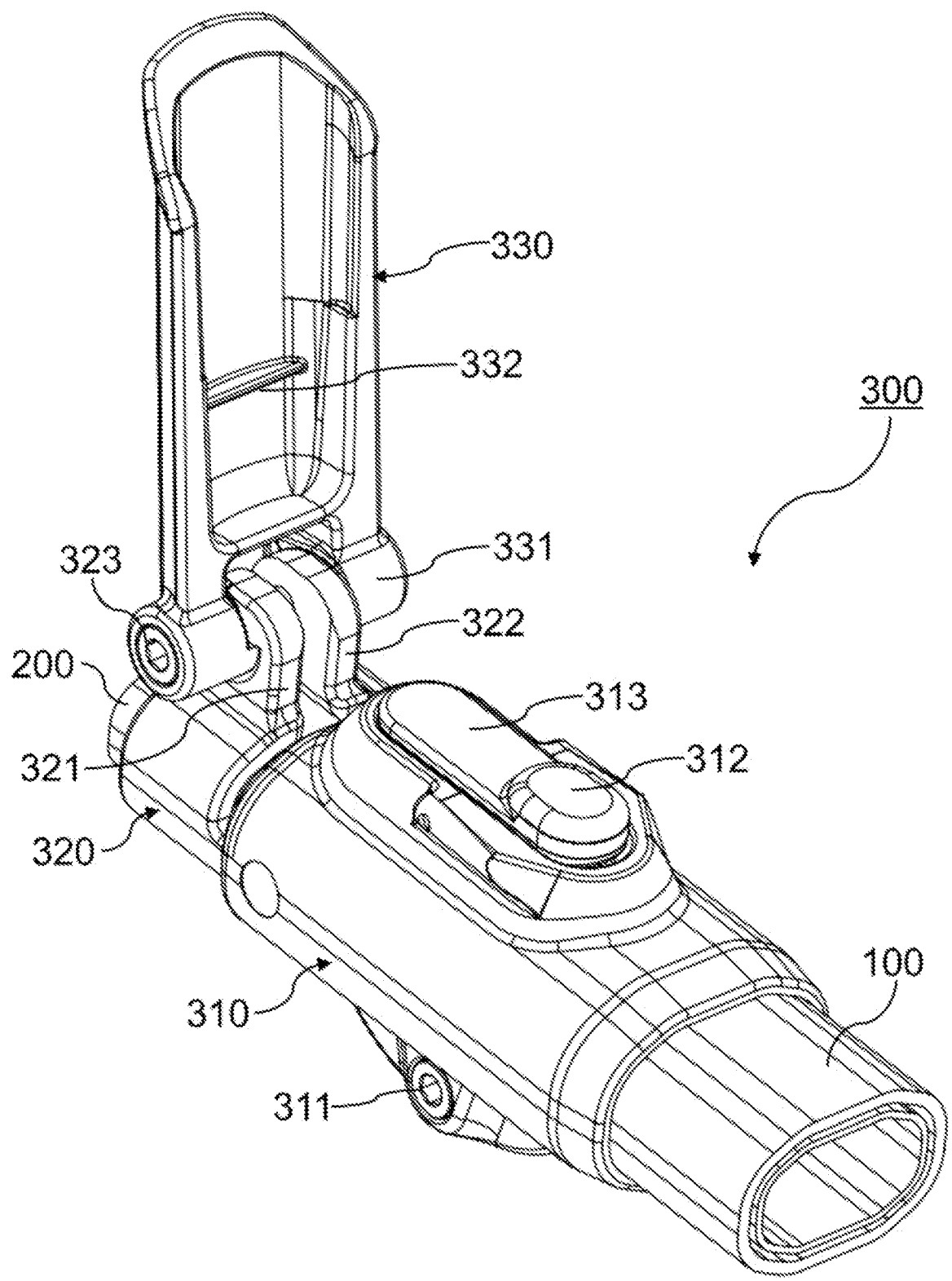
FIG. 3 is a perspective view of the extending pole clamping device when the clamping lever is open, according to the preferred embodiment of the present disclosure.
Figure 4:
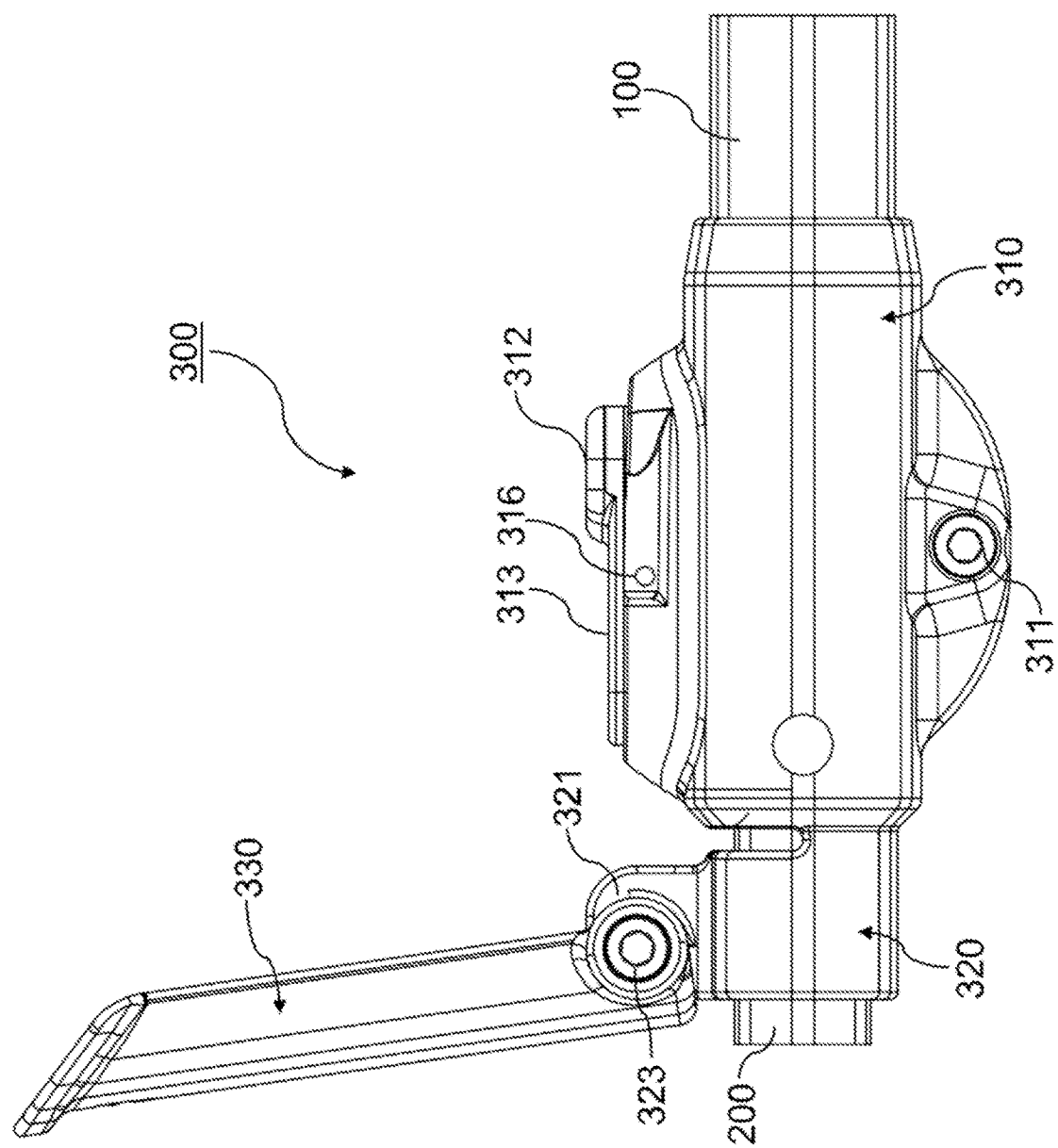
FIG. 4 is a front-side view of the extending pole clamping device when the clamping lever is open, according to the preferred embodiment of the present disclosure.
Figure 5:
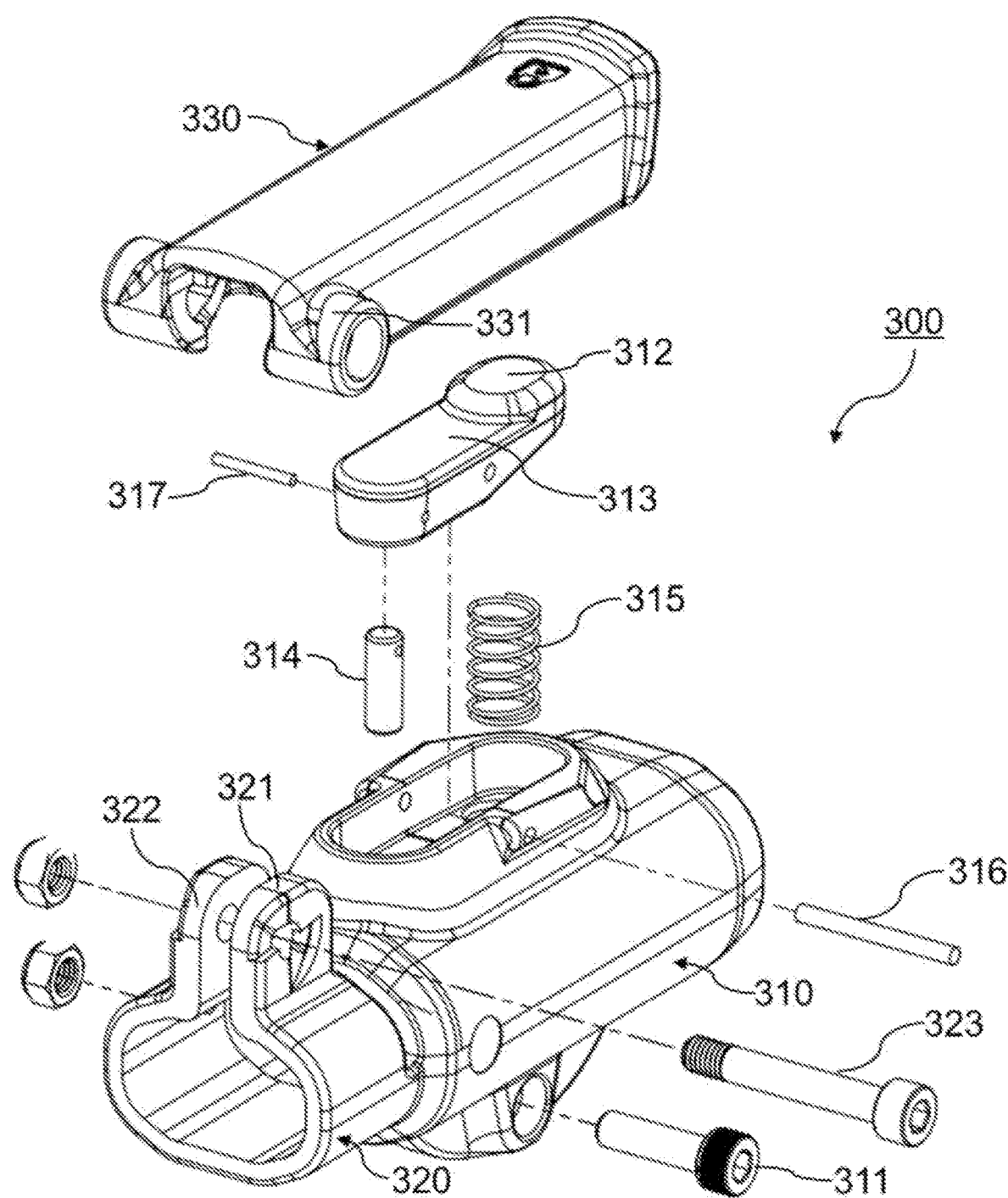
FIG. 5 is an exploded view of the extending pole clamping device according to the preferred embodiment of the present disclosure.

As shown in FIGS. 3-5 and 7-10, the extending pole clamping device 300 further comprises a push button 312 on a front side of the main body 310. The push button 312 is linked to an engagement pin 314 that penetrates the outer pole 100 and inserts into an engagement hole on the inner pole 200. When the clamping lever 330 is closed, the push button 312 is covered by the clamping lever 330 and cannot be actuated (FIGS. 1-2). When the clamping lever 330 is open, the push button 312 is exposed to allow actuation (FIGS. 3-4).

Figure 7:
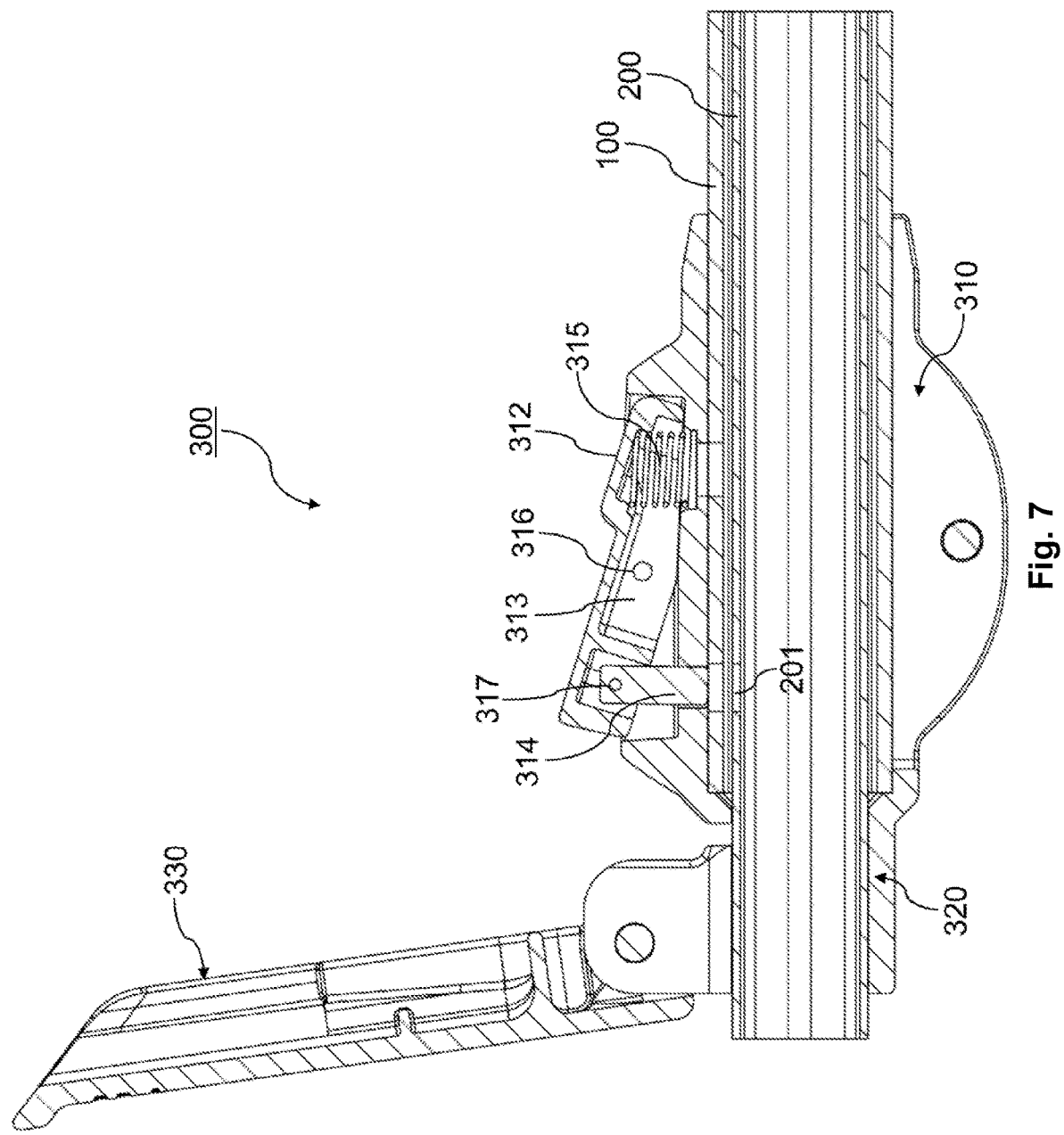
FIG. 7 is a longitudinal section view of the extending pole clamping device when the clamping lever is open and the push button is depressed, according to the preferred embodiment of the present disclosure.
Figure 8:
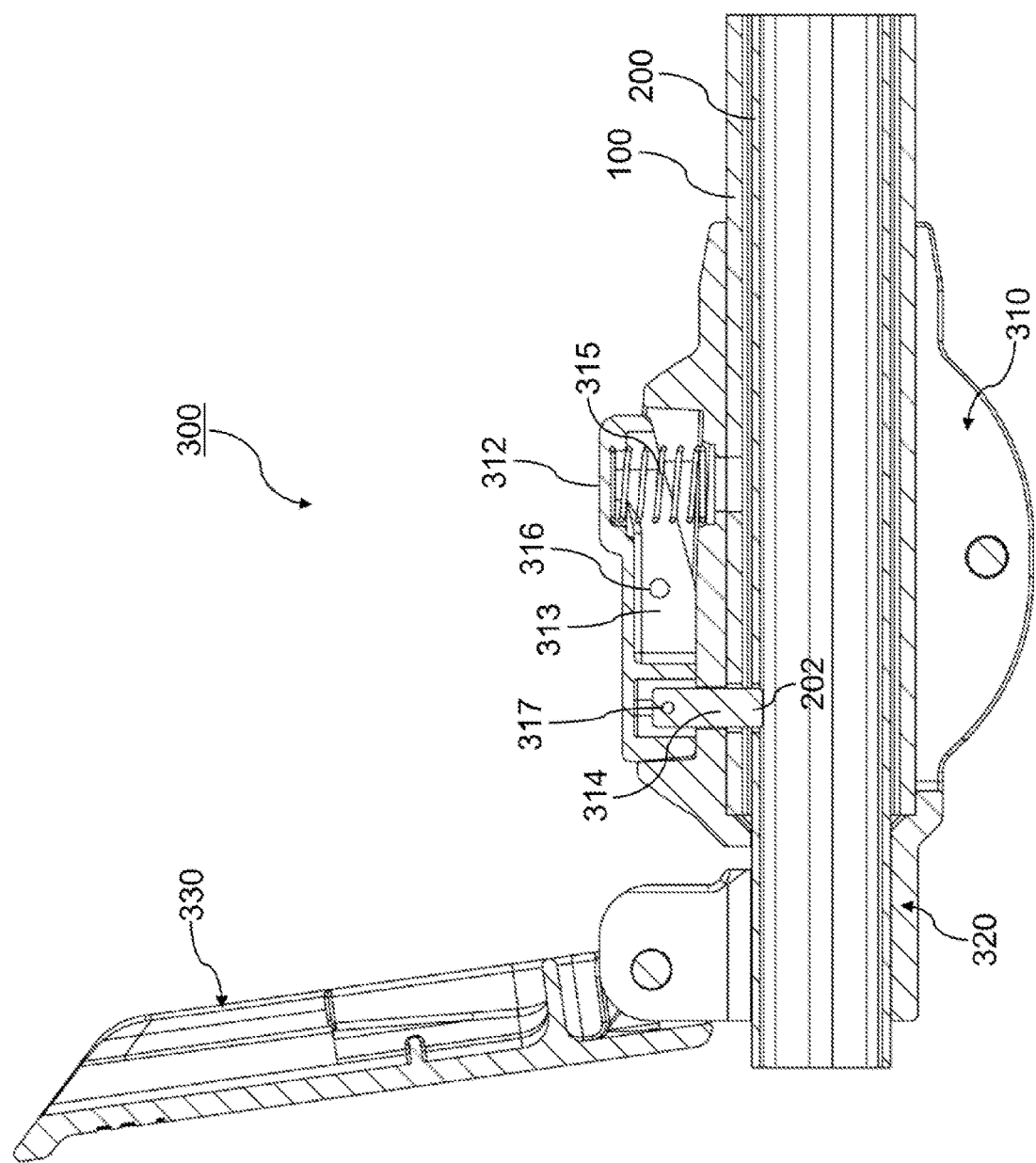
FIG. 8 is a longitudinal section view of the extending pole clamping device when the clamping lever is open and the push button is released, according to the preferred embodiment of the present disclosure.

As shown in FIG. 7, when a user depresses the push button 312, it triggers release of the engagement pin 314 from the engagement hole 201 on the inner pole 200. By keeping depressing the push button 312, the user can move the inner pole 200 longitudinally from the outer pole 100 until a second engagement hole 202 of the inner pole 200 aligned with the engagement pin 314. At this point, the user releases the push button 312 such that the engagement pin 314 inserts into the second engagement hole 202 to lock the inner pole 200 (FIG. 8). The engagement holes 201 and 202 are for illustrative purposes only. The inner pole 200 can have two or more engagement holes with a variety of distances between them according to the length that needs to be adjusted, not limiting by the exemplary embodiment shown herein.

The push button 312 may be linked to the engagement pin 314 and control the insertion and release of the engagement pin 314 from the engagement holes through a variety of means known in the art. In a preferred embodiment disclosed herein, the push button 312 is linked to the engagement pin 314 by a rod 313, wherein the push button 312 is mounted to a first end of the rod 313 and the engagement pin 314 is connected to a second end of the rod 313 by a fixed pin 317 (FIGS. 5 and 7-10). The rod 313 is pivotally fixed to the front side of the main body 310 by a screw 316 to serve as a fulcrum of the rod 313 (FIGS. 5 and 7-9). As shown in FIG. 7, when the push button 312 is depressed, the second end of the rod 313 is lifted, such that the engagement pin 314 is lifted and released from an engagement hole 201 of the inner pole 200. The clamping device further comprises a spring 315 under the push button 312. The spring 315 is biased when the push button 312 is depressed (FIG. 7). When the user releases the pressure on the push button 312, the biased spring 315 pushes the push button 312 backward, such that the second end of the rod 313 drops and the engagement pin 314 enters an engagement hole 202 of the inner pole 200 (FIG. 8).

Therefore, the extending pole clamping device 300 comprises two complementary locking mechanisms: (1) the clamping lever 330, and (2) the push button 312 with the engagement pin 314.

To unlock the extending pole clamping device 300 and adjust the length of the inner pole 200, the user firstly opens the clamping lever 330 to release the clamping force on the inner pole 200 and allow access to the push button 312. At this point, the inner pole 200 is still locked by the engagement pin 314 inserted into an engagement hole 201. The second step is to depress the push button 312 to release the engagement pin 314 from the engagement hole 201 (FIG. 7) to allow moving the inner pole 200 longitudinally and adjusting the length of the inner pole 200 inserted into the outer pole 100 by aligning the engagement pin 314 with a second engagement hole 202 on the inner pole 200.

Figure 9:
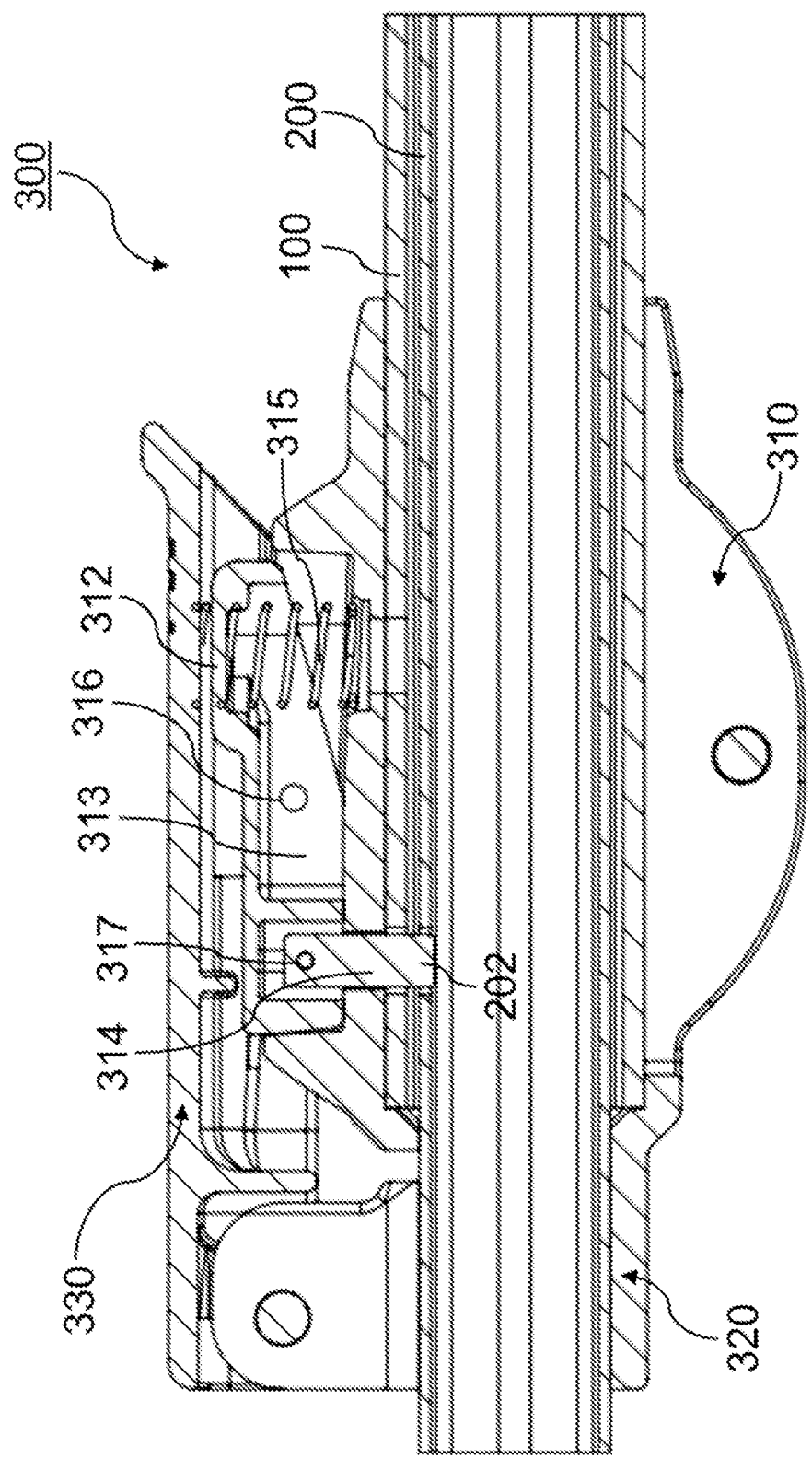
FIG. 9 is a longitudinal section view of the extending pole clamping device when the clamping lever is closed, according to the preferred embodiment of the present disclosure.
Figure 10:
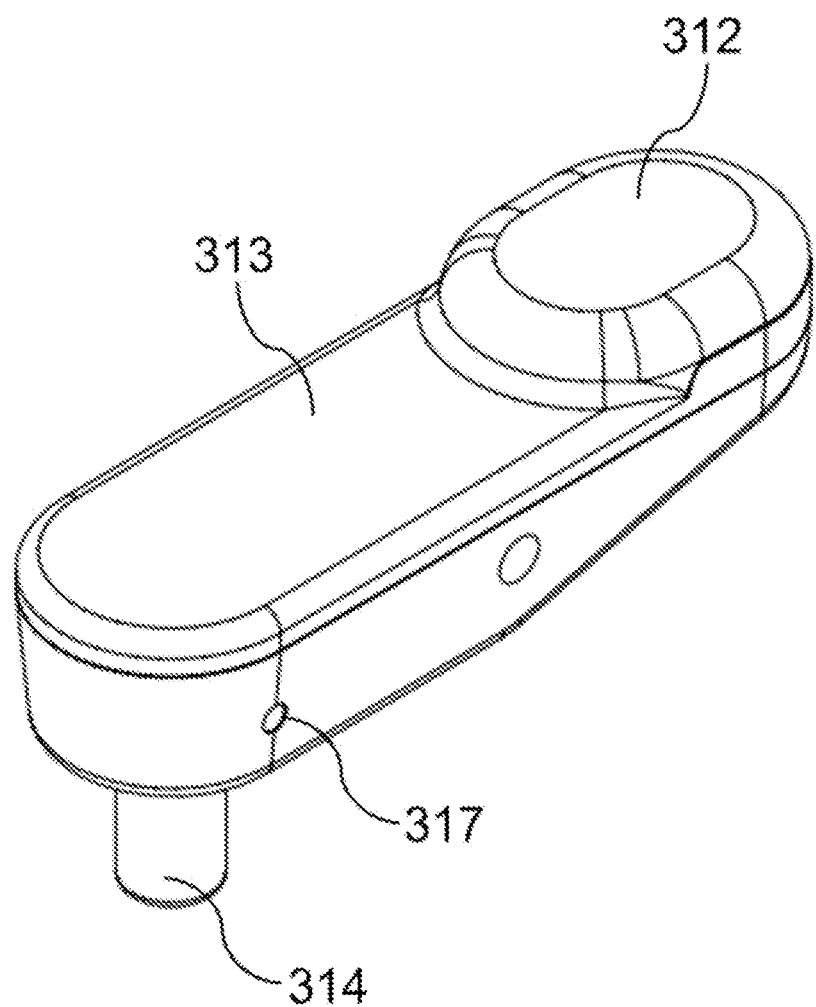
FIG. 10 is a perspective view of the push button linked to an engagement pin, according to the preferred embodiment of the present disclosure.

To lock the extending pole clamping device 300 after adjusting the length of the inner pole 200, the user firstly releases the push button 312 such that the engagement pin 314 inserts into the engagement hole 202 of the inner pole 200 (FIG. 8). The second step is to close the clamping lever 330 to cover the push button 312 and further secure the inner pole 200 by engaging the dual ramps 321 and 322 to exert clamping force on the inner pole 200 (FIG. 9).

The closed clamping lever 330 prevents accidental actuation of the push button 312 to release the inner pole 200, which adds on reliability of the clamping device 300. In some embodiments, the clamping device 300 further comprises a bar 332 on the inner surface of the clamping lever 330 (FIG. 3). When the clamping lever 330 is closed, the bar 332 touches a portion of the main body 310 that is away from the push button 312 to prohibit actuation of the push button 312. This feature provides additional safety and reliability to the device.

The complementary locking mechanism of the extending pole clamping device 300 simplifies the use of the device. It offers a user only one option at a time, one step to open/close the clamping lever 330 and another step to depress/release the push button 312. This is very intuitive and simple to operate with one hand.

The complementary locking mechanism of the extending pole clamping device 300 also improves the locking reliability of the extending poles. If the user releases the push button 312 but the engagement pin 314 does not enter one of the engagement holes of the inner pole 200, the clamping lever 330 will not be able to fully close and the user will have a visual and tactile cue that they have not correctly secured the poles. They will need to move the inner pole 200 until the engagement pin 314 enters one of the engagement holes on the inner pole 200, then the clamping lever 330 can be fully closed to its secure position.

The extending pole clamping device disclosed herein can be used for any devices and tools that comprise extendable poles. Examples include, but are not limited to tree pruners, painting rollers, cleaning brushes, and tripods. All the components of the extending pole clamping device can be manufactured by any materials that are suitable for endurable use. The shape and dimension of each component can vary from the preferred embodiments shown herein within the scope of the disclosure.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations and systems described herein may be used alone or in combination with other configurations and systems. It is to be expected that various equivalents, alternatives and modifications are possible within the scope of the foregoing description.

Any version of any component of the disclosure may be used with any other component of the disclosure. The elements described herein can be used in any combination whether explicitly described or not.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

The systems of the present disclosure can comprise, consist of, or consist essentially of the essential elements and limitations described herein, as well as any additional or optional components, or limitations described herein or otherwise useful in the art. The disclosure provided herein suitably may be practiced in the absence of any element which is not specifically disclosed herein.

While this disclosure may be embodied in many forms, what is described in detail herein is a specific preferred embodiment of the disclosure. The present disclosure is an exemplification of the principles of the disclosure is not intended to limit the disclosure to the particular embodiments illustrated. It is to be understood that this disclosure is not limited to the particular examples, configurations, and materials disclosed herein as such configurations and materials may vary somewhat. It is also understood that the terminology used herein is used for the purpose of describing particular embodiments only and is not intended to be limiting since the scope of the present disclosure will be limited to only the appended claims and equivalents thereof

What is claimed is:

1. An extending pole clamping device connecting an outer pole and an inner pole, comprising:
    a main body mounted on one end of the outer pole that receives insertion of the inner pole;
    a second body mounted on and surrounding the inner pole, wherein the second body is connected to the main body at a back portion and unconnected at a front portion, and the second body comprises dual ramps at a front side thereof; and
    a clamping lever rotatably connected at a base thereof to the dual ramps of the second body to allow the clamping lever to rotate in a longitudinal direction of the outer pole and the inner pole;
    wherein the base of the clamping lever and the dual ramps are configured such that, when the clamping lever is closed, the base of the clamping lever engages with the dual ramps to exert a clamping force on the inner pole; and when the clamping lever is open, the base of the clamping lever disengages with the dual ramps and the clamping force on the inner pole is released.

2. The extending pole clamping device of claim 1, further comprising a push button at a front side of the main body, wherein the push button is linked to an engagement pin that penetrates the outer pole and inserts into an engagement hole on the inner pole.

3. The extending pole clamping device of claim 2, wherein the inner pole comprises two or more engagement holes.

4. The extending pole clamping device of claim 2, wherein the push button is linked to the engagement pin by a rod, wherein the rod is pivotally connected to the front side of the main body; and wherein the device further comprises a spring disposed beneath the push button and configured to be biased when the push button is depressed.

5. The extending pole clamping device of claim 2, wherein the push button is covered by the clamping lever and cannot be actuated when the clamping lever is closed.

6. The extending pole clamping device of claim 2, wherein the push button is exposed to allow actuation when the clamping lever is open.

7. The extending pole clamping device of claim 2, wherein the engagement pin is released from the engagement hole on the inner pole when the push button is depressed, allowing for longitudinal movement of the inner pole.

8. The extending pole clamping device of claim 2, wherein the extending pole clamping device is unlocked to adjust a length of the inner pole inserted into the outer pole by firstly opening the clamping lever, secondly depressing the push button to release the engagement pin from the engagement hole on the inner pole, and thirdly moving the inner pole longitudinally to a position where a second engagement hole on the inner pole aligns with the engagement pin.

9. The extending pole clamping device of claim 8, wherein the extending pole clamping device is locked after adjusting the length of the inner pole inserted into the outer pole by firstly releasing the push button such that the engagement pin inserts into the second engagement hole on the inner pole, and secondly closing the clamping lever.

10. The extending pole clamping device of claim 2, wherein the clamping lever can be closed only when the engagement pin inserts into the engagement hole on the inner pole and the push button is released.

11. The extending pole clamping device of claim 2, further comprising a bar on an inner surface of the clamping lever, and when the clamping lever is closed, the bar touches a portion of the main body that is away from the push button to prohibit actuation of the push button.

\* \* \* \* \*